United States Patent
Manohar et al.

(10) Patent No.: US 7,788,332 B2
(45) Date of Patent: Aug. 31, 2010

(54) SENSOR-NETWORK PROCESSORS USING EVENT-DRIVEN ARCHITECTURE

(75) Inventors: Rajit Manohar, Ithaca, NY (US); Clint Kelly, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 898 days.

(21) Appl. No.: 11/123,234

(22) Filed: May 6, 2005

(65) Prior Publication Data

US 2006/0075210 A1    Apr. 6, 2006

Related U.S. Application Data

(60) Provisional application No. 60/568,259, filed on May 6, 2004.

(51) Int. Cl.
*G06F 15/16*    (2006.01)
(52) U.S. Cl. .................. 709/207; 709/206; 713/502; 713/300; 713/323; 713/600; 711/206
(58) Field of Classification Search ......... 709/206–207; 713/502; 711/206
See application file for complete search history.

(56) References Cited

U.S. PATENT DOCUMENTS

| | | | | |
|---|---|---|---|---|
| 4,649,473 A * | 3/1987 | Hammer et al. | ............. | 719/314 |
| 4,951,193 A * | 8/1990 | Muramatsu et al. | ......... | 711/206 |
| 5,442,758 A * | 8/1995 | Slingwine et al. | ............. | 707/8 |
| 5,469,561 A * | 11/1995 | Takeda | ....................... | 713/600 |
| 5,475,832 A * | 12/1995 | Shoji et al. | .................... | 703/15 |
| 5,481,681 A * | 1/1996 | Gallo et al. | ................. | 710/113 |
| 5,684,968 A * | 11/1997 | Flurry | ........................ | 715/806 |
| 5,771,374 A * | 6/1998 | Burshtein et al. | ........... | 713/502 |
| 5,805,859 A * | 9/1998 | Giramma et al. | ............. | 703/16 |
| 6,470,415 B1 * | 10/2002 | Starr et al. | ................... | 711/104 |
| 6,816,977 B2 * | 11/2004 | Brakmo et al. | ............. | 713/323 |
| 6,971,099 B1 * | 11/2005 | Campbell et al. | ........... | 718/102 |
| 7,167,178 B2 * | 1/2007 | Curelet-Balan | ............. | 345/467 |
| 7,280,040 B2 * | 10/2007 | DeVaul | .................. | 340/539.11 |

OTHER PUBLICATIONS

A. Boukerche, S. K. Das, A. Fabbri, and O. Yildiz. Performance analysis of a parallel PCS network simulation. Proceedings of the 6th International Conference on High Performance Computing (HiPC'99), 1999.

K. M. Chandy and J. Misra. Asynchronous Distributed Simulation via a Sequence of Parallel Computations. Communications of the ACM 24, 11 (Nov. 1981), 198-205.

(Continued)

*Primary Examiner*—Rupal D Dharia
*Assistant Examiner*—Hua Fan
(74) *Attorney, Agent, or Firm*—Jones, Tullar & Cooper, P.C.

(57) ABSTRACT

Event-driven processor architectures are particularly suited for use in multiple sensor node networks and simulators of such networks. A first variation of the processor is particularly suited for use in a sensor node in a wireless sensor network. Through use of the event-driven architecture and special message and timing coprocessors, this embodiment of the invention is optimized for low energy requirements and data monitoring operations in sensor networks. A second embodiment of the invention includes modifications necessary for use of the processor in a network simulation protocol.

13 Claims, 3 Drawing Sheets

OTHER PUBLICATIONS

R. M. Fujimoto. Parallel discrete event simulation. Communications of the ACM, 33(10): 30-53, Oct. 1990.

David Jefferson. Virtual Time. ACM Transactions on Programming Languages and Systems, 7(3):404-425, Jul. 1985.

Rajive Bagrodia, K. Mani Chandy, Jayadev Misra: A Message-Based Approach to Discrete-Event Simulation. IEEE Trans. Software Eng. 13(6): 654-665 (1987).

M. Liljenstam, R. Ronnengren, R. Ayani: MobSim++: Parallel Simulation of Personal Communication Networks. IEEE DS Online, 2(2): 1-34 pgs.(2001).

William J. Dally et al. The Message-Driven Processor: A Multicomputer Processing Node with Efficient Mechanisms. IEEE Micro, pp. 23-39, Apr. 1992.

Lutz, Chris; Rabin, Steve; Seitz, Charles l. and Speck, Don (1983) Design of the Mosaic Element. http://resolver.library.caltech.edu/caltechCSTR:1983.5093-tr-83.

Charles L. Seitz, Nanette J. Boden, Jakov Seizovic, and Wen-King Suo The design of the Caltech Mosaic C multicomputer. In University of Washington Symposium on Integrated Systems, Mar. 1993.

* cited by examiner

SENSOR-NETWORK PROCESSORS USING EVENT-DRIVEN ARCHITECTURE

CROSS REFERENCE TO RELATED APPLICATIONS

This application claims priority under 35 U.S.C. 119(e) on U.S. Provisional Application No. 60/568,259, which was filed on May 6, 2004, and is hereby incorporated by reference.

This application is also related to a U.S. patent application entitled Event-Synchronization Protocol for Parallel Simulation of Large-Scale Wireless Networks, which is being filed concurrently herewith on May 6, 2005.

GOVERNMENT SPONSORSHIP STATEMENT

This invention arose out of research sponsored by a United States Government Agency, the Office of Naval Research (ONR), under ONR Contract No. N00014-00-1-0564. The Government has certain rights in the invention.

BACKGROUND OF THE INVENTION

1. Field of the Invention

The present invention relates in general to a processor that is particularly suited for use as a sensor node processor in a sensor network. The processor employs event-driven architecture and is designed for reduced energy requirements. A variation of the processor can also be employed in a network simulation protocol.

2. Description of the Background Art

Our world is becoming increasingly connected and instrumented with sensors. Improvements in microelectronics and integrated systems have made possible sensor platforms ("nodes") that are a few millimeters in dimension. Sensor networks are typically comprised of many of these low-cost nodes and can be used to gather, process and propagate a wide variety of information from the surrounding environment. Recently, interest has focused on self-configuring wireless sensor networks and the unique challenges they pose, such as managing dynamic network topologies and maximizing the lifetime of networks in the context of limited sensor-node energy budgets. The possible applications of sensor platforms are varied, and include: smart home systems monitoring temperature, humidity and movement; vibration sensors for earthquake monitoring; stress/strain sensors for monitoring materials and machines; gas sensors for detection of chemical substances; biological sensors for the detection of microorganisms and environmental monitoring; and habitat monitoring to study species in their natural environment.

One of the key issues in the design of these sensor platforms is the power consumption of each component in the node, and in the network as a whole. Nodes typically must be able to perform a combination of computation, wireless communication, and sensing. Each node also contains a power source, which can consist of a conventional battery, a renewable source that generates power using scavenging techniques (e.g. vibration based, solar based, RF based), a radioactive thin-film that generates high-energy particles, or some combination of these ideas, to name some of the possibilities. The lifetime of a sensor network is a function of the operations (computation, communication, sensing) performed by its nodes and of the amount of energy stored in its nodes' batteries.

Conventional wisdom in sensor network design typically focuses on minimizing communication, because conventional communication links consume a significant amount of energy—an amount that contains a term that is dictated by the distance the link must be able to span. However, recent developments in self-powered MEMS-based RF communication devices and in network organization can lead to sensor networks where the communication link is entirely self-powered, shifting the focus to the energy requirements of the computation being performed. The concept of sensor networks with mobile agents treats a collection of sensor nodes as a statistical entity. Instead of thinking of the communication link as something that must be reliable, the shift is to use a statistical treatment that attempts to infer properties of the network based on information from a subset of the sensor nodes and some knowledge about correlations among the monitored data values.

Most of the application development and communication-protocol design for these sensor nodes is done using network simulators. After the application and protocol software functions properly in the simulation environment, it is then deployed on the actual nodes, each of which contains at the very least a processing element, a radio interface and some way of interacting with its environment. Today's sensor nodes typically use commodity microcontrollers for their processing elements. Unfortunately, the behavior predicted by simulation may vary dramatically from that observed in the real network; researchers must typically perform several debug-and-test cycles before the sensor network actually performs as predicted, and even this has only been achieved for small networks.

Much of the complexity of deploying wireless sensor networks arises due to the disparity between the simulation and the actual hardware implementation. Even the most detailed simulation models do not accurately model the hardware limitations (such as limited message buffering, memory allocation latencies or processing-time requirements) of the actual node on which the sensor application will run. Moreover, modifying known simulation models to accurately model these factors would probably not be useful, as the time required to simulate several hundred to several-thousand nodes would become unreasonably long (and would require a great deal of memory).

SUMMARY OF THE INVENTION

The present invention provides designs for event-driven processor architectures that are particularly suited for use in the aforementioned sensor networks and simulators of such networks. A first variation of the processor is particularly suited for use in a sensor node in a wireless sensor network. Through use of the event-driven architecture and special timing and message coprocessors, this embodiment of the invention is optimized for low energy requirements and data monitoring operations in sensor networks. A second embodiment of the invention includes modifications necessary for use of the processor in a network simulation protocol.

In both preferred embodiments, the processor contains hardware support for commonly-occurring operations in sensor networks and is designed to maximize the lifetime of a network. The event-driven architecture is designed to provide extremely low-overhead transitions between active and idle periods. Although not required, the processors in the preferred embodiments are also asynchronous. The use of asynchronous circuits results in automatic, fine-grained power management, because circuits that are not required to perform a particular operation do not have any switching activity. Using asynchronous circuits also necessitates that glitches or switching hazards are eliminated on the processor, thus removing another source of energy waste. The hardware support for event execution in the processor obviates the need for the processor to run an operating system. Not having to run an operating system on the processor not only reduces static and dynamic instruction counts, but also allows the design of the processor to be simplified, which does not need to support functions such as precise exceptions and virtual memory translation. The design resembles a microcontroller and uses an extremely small amount of energy per operation.

BRIEF DESCRIPTION OF THE DRAWINGS

The various features and advantages of the invention will become apparent to those of skill in the art from the following description, taken with the accompanying drawings, in which.

DETAILED DESCRIPTION OF THE PREFERRED EMBODIMENTS

Figure 1:
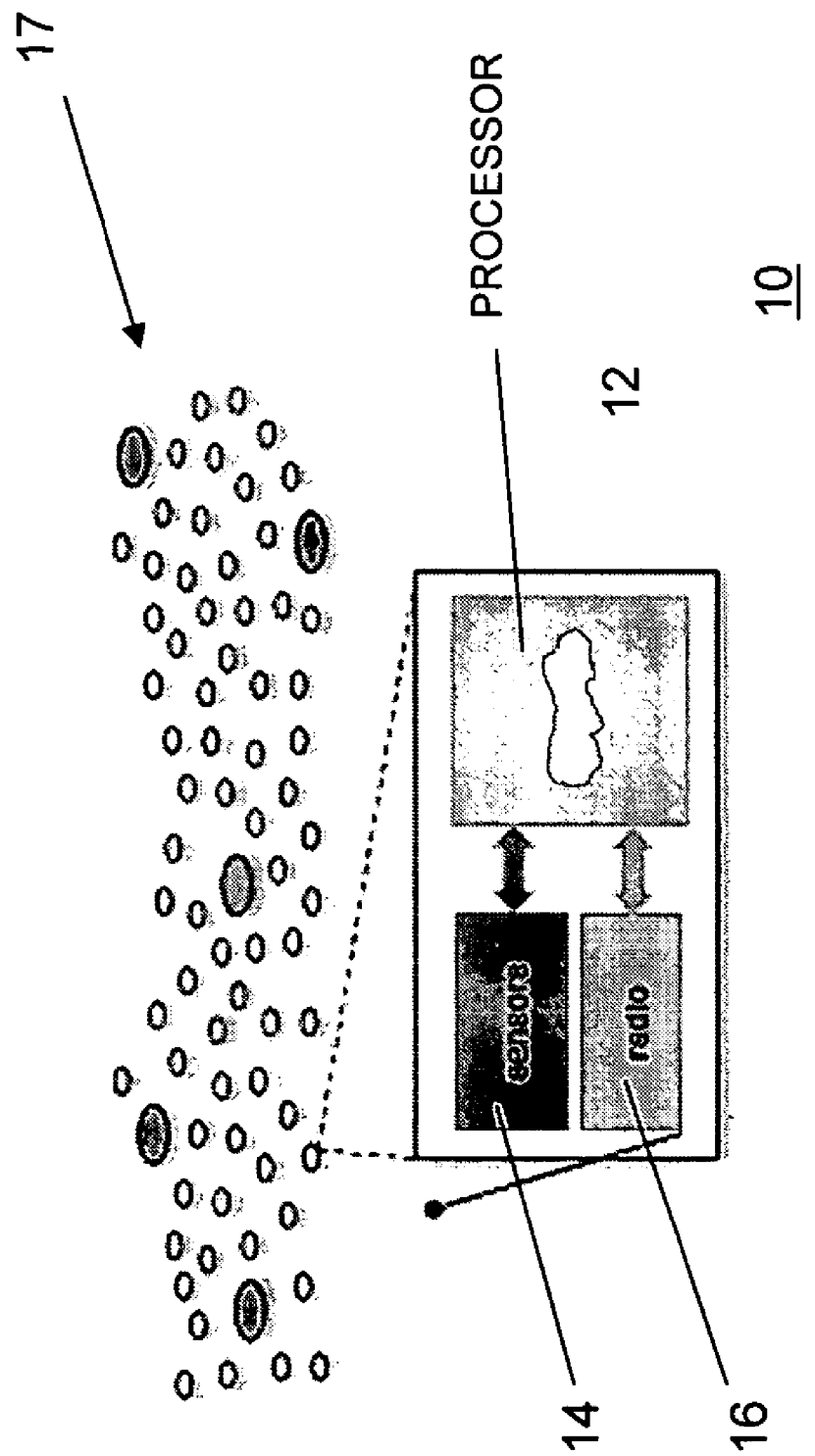
FIG. 1 is a schematic diagram of a sensor node used in a wireless sensor network which incorporates an event-driven processor configured in accordance with a first preferred embodiment of the invention.

A first preferred embodiment of the present invention comprises a processor architecture that is optimized for data monitoring operations in sensor networks with minimum energy consumption. Preferably, though not required, the processor is an asynchronous microprocessor that contains hardware support for commonly-occurring operations in sensor networks. The processor is event-driven, with extremely low-overhead transitions between active and idle periods. The use of asynchronous circuits results in automatic, fine-grained power management, because circuits that are not required to perform a particular operation do not have any switching activity. Using asynchronous circuits also necessitates that glitches or switching hazards be eliminated in the processor, thereby removing another source of energy waste.

The hardware support for event execution in the processor obviates the need for the processor to run an operating system. Not having to run an operating system not only reduces static and dynamic instruction counts, but also allows the design of the processor to be simplified, which does not need to support functions such as precise exceptions and virtual memory translation. The design resembles a microcontroller and uses an extremely small amount of energy per operation. The processor is designed to be a stand-alone, low-energy processor for use in sensor network nodes.

Asynchronous systems do not use clocks for sequencing. With the advent of larger and larger dies and faster and faster circuits, the signal propagation delay across a chip has become greater than a single cycle, leading circuit designers to consider asynchronous design for system-level integration approaches. Researchers have proposed globally asynchronous/locally synchronous designs as a way to mitigate global timing issues in clocked systems while still using conventional clocked design in local regions of a chip. Locally asynchronous/globally synchronous designs have also been proposed as a way to use asynchronous designs to improve the performance of local components while integrating them into conventional, clocked system-level architectures. The subject processor, on the other hand, is an entirely asynchronous system; there are no clocks in any component of this design.

A clock in a synchronous processor is used for synchronization purposes, and to determine when data is valid (the precise nature of this depends on the clocking discipline). The use of a clock allows one to think of the computation as being a sequence of operations, each taking the same amount of time. An asynchronous circuit must use additional circuitry to synchronize communication. The clock signal is also used to determine when a particular signal should be examined. The absence of a global clock implies that a circuit observing a particular signal cannot ignore spurious transitions on that signal (glitches or switching hazards). Therefore, every signal in an asynchronous design must be hazard-free. The additional circuits required for synchronization constitute the overhead incurred by adopting an asynchronous approach.

Asynchronous circuits use a handshaking protocol to implement synchronization. Data validity can be encoded in a variety of ways, depending on the particular nature of the asynchronous circuit. The subject processor uses quasi delay-insensitive (QDI) circuits. The QDI design style is arguably the most conservative asynchronous design style; a QDI asynchronous circuit is guaranteed to operate correctly regardless of the delays in the devices used to implement the circuit, as long as the circuit satisfies a minor relative timing assumption on the delay of some wires that connect the output of a gate to the inputs of multiple gates (known as an isochronic fork assumption). This assumption is necessary to build non-trivial asynchronous circuits, and its incorporation permits the design of arbitrary asynchronous computations.

Although asynchronous QDI designs do not include any clocks, there is a well-defined notion of cycle time, which is the inverse of the rate at which instructions are executed by the processor. The difference between the clock cycle time and the asynchronous cycle time is that the latter can vary depending on the dynamic state of the processor and the operation being performed.

The sensor network processor includes a number of specific characteristics that are desirable for such processors. First, it includes a lower-power sleep mode. The data-gathering sensor nodes for which the processor was designed will be idle much of the time. Therefore, the power consumption of the processor while it is "asleep" (not computing) will play a large role in determining the battery life of the nodes.

Second, the processor includes a low-overhead wakeup mechanism. When an event, such as the arrival of a radio packet, occurs, the processor will wake up, execute some code, and then go back to sleep. Ideally, the time spent waking up and going to sleep should be much less than the time spent executing code. It is estimated that the processor will require on the order of microseconds to execute the code to handle a given event. The processor is designed, however, to be able to wake up or go to sleep in tens of nanoseconds.

Third, the processor also exhibits low power consumption while awake. Although the power consumption of the processor while it is "asleep" will play an important role in determining the battery life of a node, the processor should also be energy-efficient while it is "awake" (computing).

Finally, the processor uses simple programming so that programmers are able to use the processor easily. The nodes in the sensor networks described earlier will be asleep most of the time, periodically waking up to handle radio traffic or sensor data. The programming model for the processor maps easily to this behavior. Moreover, the programmer (or compiler) should be able to easily implement actions that a sensor network node frequently performs, such as scheduling internal timers or reading sensor data.

The sensor network processor was designed with the foregoing features in mind. The essential difference between the subject processor and a conventional microprocessor or microcontroller is that the subject processor is event-driven. The processor begins by executing some boot code, and then waits for an event to occur, at which point it executes the appropriate event handler. The processor can then be considered to have two states: awake (executing the boot code or an event handler) and asleep (waiting for an event to occur).

FIG. 1 shows a sensor network node 10 that employs a sensor network processor 12 to communicate with one or more sensors 14 and a radio transceiver 16. The radio transceiver 16 facilitates communications with other sensor nodes in a sensor network 17. The external events to which the processor 12 can respond are incoming radio traffic and sensor readings. The processor 12 may also schedule timeouts, for example to wake itself up periodically to take sensor readings. The end of such a timeout is an internal event.

Figure 2:
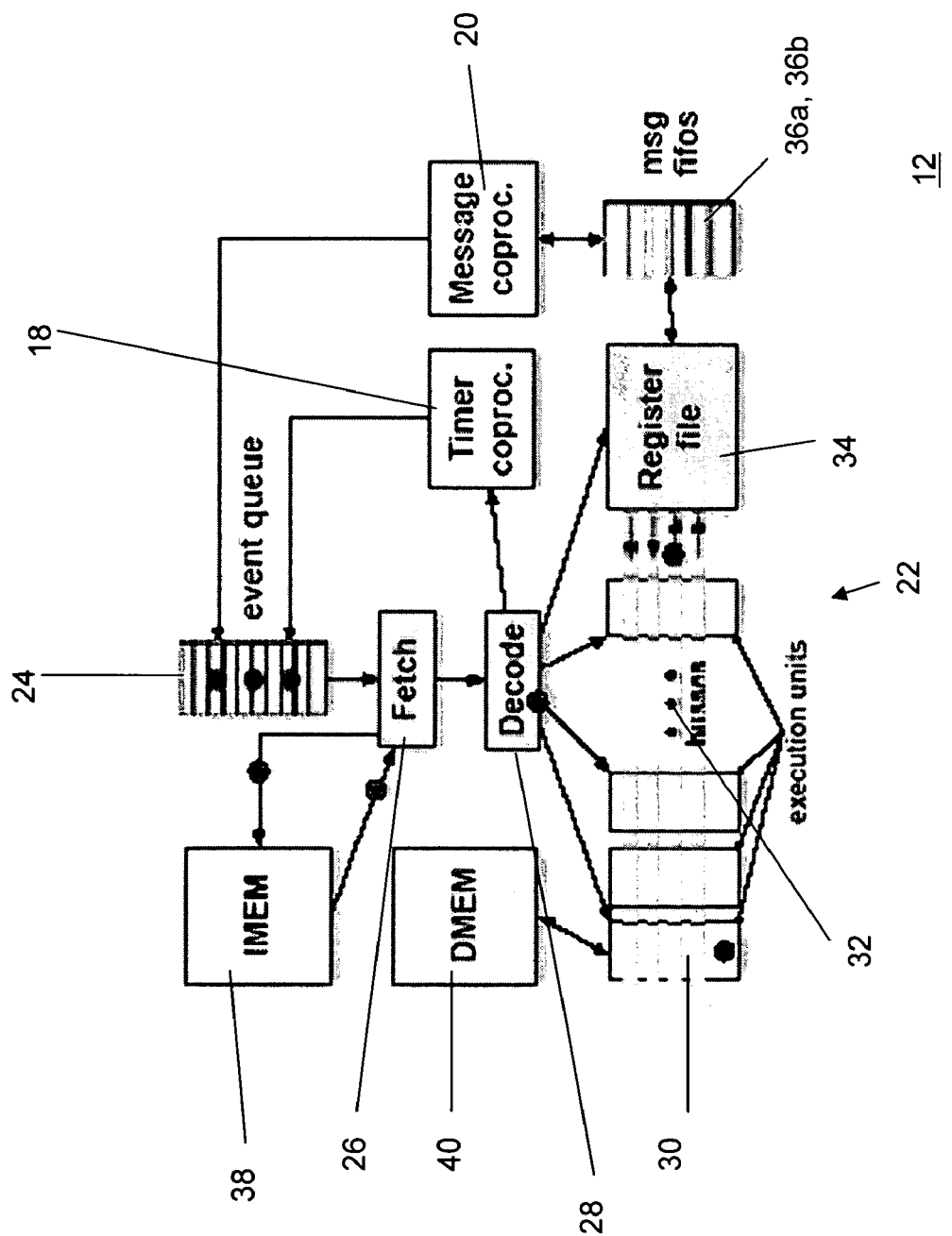
FIG. 2 is a block diagram of the elements in one of the event-driven processors.

FIG. 2 shows the architecture of the sensor network processor 12. The processor 12 consists of three components: (1) a timer coprocessor 18, which schedules internal timeouts, (2) a message coprocessor 20, which provides an interface to the sensor node's sensors 14 and radio 16, and (3) a processor core 22, which consists of an event queue 24, instruction fetch 26, decode 28, execution units 30, busses 32, register file 34, incoming and outgoing message FIFOs 36a and 36b, and memories 38 and 40 (everything in FIG. 2 other than the two coprocessors 18 and 20, in other words).

In the preferred embodiment, the processor 12 has an in-order, single-issue core that does not perform any speculation. It has a 16-bit datapath; instructions can consist of one or two 16-bit words (two-word instructions take two cycles). Although the processor is not highly-pipelined at the circuit level, it can support the simultaneous execution of several instructions. FIG. 2 shows the potential concurrency of the processor; the solid circles correspond to instruction tokens in-flight during execution (the circles in the event queue correspond to outstanding events that are yet to be processed). These instruction tokens travel through the pipeline and are transformed by the computation blocks (adders, decoders, etc.) through which they move. Because the processor employs asynchronous circuits, each computation block will have no switching activity until a token arrives at one of its inputs. This data-driven switching activity reduces the total switching capacity of the processor, saving energy. These energy savings come as a direct result of use of QDI asynchronous circuits; to achieve equivalent savings in a clocked processor, the designer would have to clock gate every latch in the processor.

The most interesting components of the processor core 22 are the event queue 24 and the instruction fetch 26, which combine to form a hardware implementation of a FIFO task scheduler. The processor 12 begins by executing its boot code. The last instruction in the boot code is the special "done" instruction, which tells the instruction fetch 26 to stop fetching instructions and to wait for an event token to appear at the head of the event queue 24. Event tokens can be inserted into the event queue 24 by the timer coprocessor (when a timeout finishes) or by the message coprocessor 20 (when data arrives from the sensor node's radio 16 or one of its sensors 14). Each event token contains information that indicates which event occurred. If an event token is present at the head of the event queue 24, the instruction fetch will remove it and use it as in index into the processor's event-handler table to determine the address of the appropriate event handler. The processor 12 will execute instructions starting at that address until it reaches another done instruction, at which time it will check the event queue 24 again.

If the event queue 24 is empty when the processor 12 executes a done instruction, the fetch 26 will stall until an event token appears. As soon as the core 22 finishes executing the instructions that preceded the done instruction, all switching activity in the core 22 will stop, and the processor 12 will be "asleep." In this manner, the design goal of having a low-power sleep mode is achieved. The time required for the processor 12 to wake up and begin executing a new event handler is merely the time for an event token to propagate through the event queue 24. This time is on the order of tens of nanoseconds. Therefore, the goal of having the time for the processor 12 to wake up and fall back asleep be much less than the time that the processor 12 will spend executing event handlers is also achieved.

Conventional processors and microcontrollers typically have several sleep states. A processor in a "deeper" sleep state uses less power but requires more time to wake up than a processor in a "lighter" sleep state. The sensor network processor 12 of the present invention, on the other hand, only has a single sleep state, during which all switching activity in the core 22 stops. The time to wake up from this sleep state is on the order of tens of nanoseconds. Thus, the processor 12 provides the best of both worlds: the energy savings of "deep" sleep with the low wake-up latency of "light" sleep.

The processor instruction set architecture (ISA) is designed to execute handlers, and not a full operating system. Therefore, the processor 12 does not support precise exceptions, which have additional overhead even in in-order issue asynchronous processors due to the information necessary to reconstruct program order after the decode issues instructions to different execution units. The processor ISA does not support virtual memory or even interrupts. All external events are processed through the event queue 24, which prevents an event handler from being preempted by the occurrence of a new event. This guarantees atomicity of handler execution, eliminating any concurrency management issues that could arise due to handler interleaving. Interrupts that would normally be required for off-chip interfaces are translated into events by the timer and message coprocessors 18 and 20, thereby removing the need to support exceptions or interrupts in the processor core 22.

The processor 12 has two on-chip 4 KB memory banks 38 and 40 and no caches. The first bank, the IMEM 38, contains instructions; the other, the DMEM 40, contains data. The core 22 can write to either the IMEM 38 or the DMEM 40, allowing it to modify its own code (and also providing a way to bootstrap the processor 12 by sending it code over the radio link). In an embedded environment, the processor 12 could be designed with its IMEM implemented partially or entirely using ROM, but in this embodiment, it is designed using RAM so that many different experiments can be run on the chip once it is fabricated.

One advantage of building the sensor network processor 12 with QDI asynchronous circuits is that its design can be optimized for average-case, rather than worst-case, behavior. As an example, consider the busses 32 in the processor 12. Instead of attaching all of the execution units 30 directly to one set of busses 32, a two-level bus hierarchy is employed that consists of one set of "fast" busses and one set of "slow" busses. The most commonly-used execution units connect directly to the fast busses, and those that are used less often connect to the slow busses. The fast busses communicate directly with the register file 34, whereas the slow busses communicate with the register file 34 through the fast busses. This scheme improves the datapath's average-case performance by dramatically decreasing the amount of capacitance on the fast busses. Moreover, because the processor 12 uses asynchronous circuits, there is no need to add any additional logic to handle the timing variations introduced by the different busses (or by the varying, data-dependent throughput of different execution units).

The processor uses the timer coprocessor 18 to schedule timeouts. The timer coprocessor 18 consists of three self-decrementing, 24-bit timer registers. To schedule a timeout, the processor sends 12 to the timer coprocessor both a timer number (indicating which of the three timer registers to use) and a timeout duration. The timer coprocessor 18 then sets the appropriate timer register and the register begins decrementing itself. If necessary, the decrementing frequency can be calibrated against a precise timing reference. When a timer register decrements itself to zero ("expires"), the timer coprocessor 18 inserts an event token into the event queue (the token contains information indicating which of the three timer registers expired, since each has its own entry in the event-handler table). Timer registers that are not decrementing have no switching activity, and therefore use little energy.

The core 22 can also cancel a previously-scheduled timer register. To avoid the race condition in which the core attempts to cancel a timer register that has already expired, the timer coprocessor is designed such that it inserts tokens into the event queue for canceled timer registers as well as for those that have expired. The software running on the core must therefore maintain information about which timer registers it has canceled.

Figure 3:
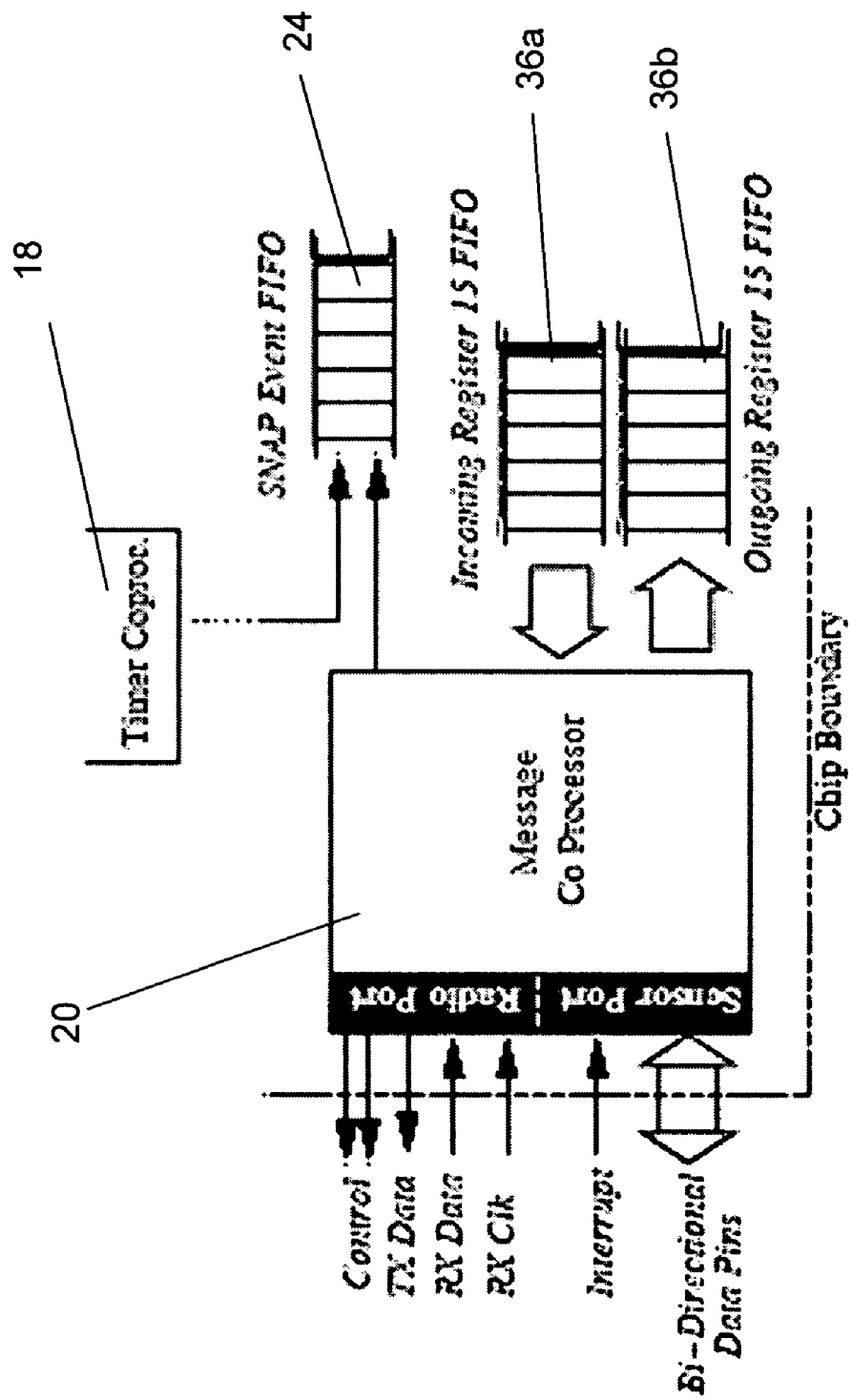
FIG. 3 is a schematic diagram showing the details of a message coprocessor that is employed in the event-driven processor of the present invention.

The message coprocessor 20, shown in detail in FIG. 3, is the interface between the processor core 22 and the external sensors 14 and radio 16. All communication with the radio 16 and sensors 14 is handled through the two 16-bit message FIFOs 36a and 36b that map to a general-purpose register 15 (r15). The processor's register file 34 actually has only fifteen physical registers. An instruction that writes a value to r15 will cause the processor core to insert a value into the message coprocessor's incoming FIFO 36a, and an instruction that reads from r15 causes the processor core to remove an entry from the head of the message coprocessor's outgoing FIFO 36b. When an external event, such as the reception of a word from the radio or a new sensor reading, occurs, the message coprocessor inserts a token into the processor's event queue.

To receive radio transmissions, a program writes an RX command word to r15, signaling the message coprocessor to configure the radio for reception. Once the radio detects an incoming transmission and sends a 16-bit word to the processor, the message coprocessor will notify the core via the event queue, and insert the data into its outgoing r15 FIFO 36b. This method of word-by-word message reception was chosen because of the relatively slow radio data rates (around 19.2 kbps), which would otherwise stall the processor core for almost a millisecond per word. It is, however, a much more efficient scheme than the bit-by-bit interrupt scheme most microcontrollers use to receive data, because the bit/word conversions are handled by the message coprocessor, leaving the core free to process other events. The scheme for transmission is similar to that for reception, except that the core writes a TX command followed by a data word to r15.

Communicating with the sensors 14 can be active (driven by polling) or passive (driven by external interrupts). If a sensor asserts the external-interrupt pin connected to the message coprocessor 20, the message coprocessor 20 will insert a token into the processor's event queue 24. To poll the sensor data pins, the core 22 sends a Query command to the message coprocessor 20, which will read the sensor data pins, insert the value into the r15 queue, and send a token to the processor event queue 24.

The second preferred embodiment of the present invention differs from the first primarily in the fact that it is specifically designed to run a time based synchronization (TBS) simulation protocol of a sensor network and therefore employs special programming. This embodiment was originally designed to be one of many interconnected processors on a single chip that form a so-called network on a chip (NoC). Two characteristics of the processor are required if it is to efficiently execute a TBS-based simulation: (1) the ability to quickly exchange messages with other of the processors in the NoC (lower latency for message-passing between processors directly affects the time scale) and (2) the ability to easily manage its event queue ("managing" an event queue includes scheduling events, canceling previously scheduled events, and determining when events have become executable). The area of a single processor should also be as small as possible, so that a large number, e.g. 100 processors per chip can be achieved.

The TBS simulation protocol is intended to run at speeds greater than real time. To accommodate this, the processor in the second preferred embodiment includes one notable difference from the sensor network processor in the first embodiment. The timer coprocessor contains a self-incrementing counter called the incrementer, which is a time tracking device. The rest of the coprocessor must be fast enough to keep up with the rate at which the incrementer changes. Every timestamp register must be compared against the incrementer every time the incrementer's value changes. The software running on the processor can adjust the time scale of the simulation by taking different samples of the incrementer. To schedule an event, the software uses an instruction to set a timestamp register to the timestamp of the event it wishes to schedule.

Although the timer coprocessor must compare every timestamp register against the value of the incrementer every time the incrementer changes, it does not have to finish the comparisons before the incrementer changes again. The comparison process can be pipelined such that one set of comparisons (the comparisons between every timestamp register and one value of the incrementer) completes every cycle.

In summary, the creation of the subject event-driven processors has several benefits for researchers studying sensor networks. First, the processor enables low power management of sensor network nodes. It also facilitates faster simulation of large-scale sensor networks. Another advantage of the processor is the provision of a common software interface. Because the processor is designed to be used to build both physical and simulated nodes, researchers studying sensor networks will be able to use a single software interface. A researcher is able to use the same protocol code for the simulation and implementation of a given node in a sensor network.

Although the invention has been disclosed in terms of preferred embodiments and variations thereon, it will be understood that numerous other variations and modifications could be made thereto without departing from the scope of the invention as defined in the following claims. For example, although the disclosed processors are particularly suited for use in senor networks and executing simulation protocols of the same, the processors could be employed in any environment where their event driven architectures are beneficial either from a speed or a reduced energy consumption standpoint.

What is claimed is:

1. An event-driven processor for executing tasks in response to the occurrence of one or more events, said processor comprising:

a processor core that includes:
  a memory;
  at least one execution unit;
  an event queue for storing one or more event tokens, each of which contains event identification information that indicates an event that has occurred which requires that a corresponding task is to be executed by said execution unit and a location in said memory where one or more instructions corresponding to the task to be executed by said execution unit is located;
  a fetch for sequentially processing each of said event tokens in said event queue by carrying out the processing steps of:
    retrieving a first of said event tokens from said queue;
    employing said event identification information to locate and fetch one or more instructions from said memory for execution by said execution unit, said instructions corresponding to the task to be executed;
    atomically delivering said instructions to said execution unit for execution until a done instruction is fetched from said memory which indicates that all of the instructions for said task have been fetched and delivered to said execution unit; and
    when said done instruction is fetched, repeating said processing steps for a next event token if present in said queue, but if said queue is empty, ceasing further fetching of instructions from said memory until another event token is detected in said event queue by said fetch;—
  a message coprocessor for generating external event tokens in response to communications received from one or more external devices and placing said external event tokens in said event queue for processing by said processor core; and
  a timer coprocessor for generating an internal event token when a timeout occurs and placing said internal event token in said event queue to cause said fetch to retrieve instructions corresponding to said internal event token from said memory and deliver said instructions to said execution unit for execution; whereby, said execution unit periodically transitions from an idle state to an active state even when no external event tokens have been placed into said event queue by said message coprocessor.

2. The processor of claim 1, wherein said timer coprocessor includes a plurality of said timers, each of which can be set to time out at after expiration of a predetermined interval.

3. The processor of claim 1, wherein said processor is configured to operate in a polling mode by sending a signal periodically from said execution unit to said message coprocessor which causes said message coprocessor to request data from at least one external device and upon receipt of data from said at least one external device, place a corresponding event token in said event queue.

4. The processor of claim 1, wherein said processor includes a plurality of said execution units and said processor further comprises a plurality of registers; a high speed bus interconnecting said registers to ones of said execution units that are frequently used and a slow speed bus interconnecting said registers to other ones of said execution units through said high speed bus.

5. A system comprising a plurality of the processors of claim 1 which are formed in a network on a semiconductor chip.

6. The processor of claim 1, wherein said processor is an asynchronous, clockless processor which automatically transitions to a low power sleep state when all event tokens in said queue have been processed and transitions out of said sleep state when another event token is placed in said event queue.

7. The processor of claim 1, wherein said processor forms part of a sensor-network processing node in a network of said nodes and said node includes one or more sensors for measuring one or more parameters and communicating said measurements to said processor; and a radio transceiver for enabling said node to communicate with other nodes in said network.

8. An event-driven method for managing events with a processor that includes a memory, at least one execution unit, an event queue, a fetch, a message coprocessor and a timer coprocessor, said method comprising the steps of:
  generating one or more external event tokens with said message coprocessor, each of which contains event identification information that indicates an external event that has occurred which requires that a corresponding task is to be executed by said execution unit and a location in said memory where one or more instructions corresponding to the task to be executed by said execution unit is located;
  generating one or more internal event tokens with said timer coprocessor, each of which contains event identification information that indicates an internal timeout event that has occurred which requires that a corresponding task is to be executed by said execution unit and a location in said memory where one or more instructions corresponding to the task to be executed by said execution unit is located;
  placing each of said event tokens in said event queue; and
  in response to detection by said fetch that at least one token is present in said event queue, said fetch carrying out the steps of:
    retrieving a first of said event tokens from said event queue;
    employing said event identification information to locate and fetch one or more instructions from said memory for execution by said execution unit, said instructions corresponding to the task to be executed;
    atomically delivering said instructions to said execution unit for execution until a done instruction is fetched from said memory which indicates that said execution unit is done executing all of the instructions for said task; and
    when said done instruction is fetched, repeating said processing steps for a next event token if present in said queue, but if said queue is empty, ceasing further fetching of instructions from said memory until another event token is detected in said event queue by said fetch.

9. The method of claim 8, wherein when said fetch retrieves an internal event token from said event queue that has been placed in said event queue by said timer coprocessor and requests polling of said one or more external devices by said processor, said fetch retrieves one or more instructions from said memory which, when sequentially delivered to said one or more execution units for execution, cause said one or more execution units to send a command to said message coprocessor to obtain information from said one or more external devices and when information is obtained from said one or more external devices, said message coprocessor generates one or more external event tokens and places them into said event queue for processing by said one or more execution units.

10. The method of claim 8, wherein a plurality of said execution units is provided and a register file in said processor communicates with frequently used ones of said execution units via a high speed bus and communicates with other ones of said execution units with a slow speed bus.

11. The method of claim 8, wherein a plurality of said processors are formed in a network on a semiconductor chip and each said processor is configured to carry out the steps of claim 8.

12. The method of claim 11, wherein each of said processors forms part of a corresponding sensor node in said network and each node further includes one or more sensors which send sensor measurement information to said processor and a radio transceiver for communicating with other ones of said processors in said network.

13. The method of claim 8, wherein said processor is an asynchronous, clockless processor which automatically transitions to a low power sleep state when all event tokens in said queue have been processed and transitions out of said sleep state when another event token is placed in said event queue.

* * * * *